United States Patent
Nakamura et al.

(10) Patent No.: US 6,408,189 B1
(45) Date of Patent: Jun. 18, 2002

(54) RADIO COMMUNICATION SYSTEM AND COMPUTER PROGRAM PRODUCT FOR CONTROLLING AN OPERATION OF THE RADIO COMMUNICATION SYSTEM

(75) Inventors: Kenzo Nakamura; Yoshihiro Matsuno; Mototaka Ishikawa, all of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/438,423

(22) Filed: Nov. 12, 1999

(30) Foreign Application Priority Data

Nov. 11, 1998 (JP) .......................................... 10-321158

(51) Int. Cl.[7] .............................. H04B 7/05; H03H 7/30

(52) U.S. Cl. ...................... 455/504; 455/67.1; 455/69; 455/506; 375/229; 375/226

(58) Field of Search .................................. 455/504, 505, 455/506, 501–503, 69, 522, 436–439, 115, 67.1, 423; 714/704; 375/226, 227, 229, 341, 350

(56) References Cited

U.S. PATENT DOCUMENTS

| | | | |
|---|---|---|---|
| 5,297,165 A | * 3/1994 | Ueda et al. .................... | 375/12 |
| 5,345,600 A | * 9/1994 | Davidson .................... | 455/504 |
| 5,471,655 A | * 11/1995 | Kivari ........................ | 455/127 |
| 5,625,875 A | * 4/1997 | Whinnett et al. ............ | 455/513 |
| 5,710,792 A | * 1/1998 | Fukawa et al. ............. | 375/229 |
| 5,815,507 A | * 9/1998 | Vinggaard et al. .......... | 714/704 |
| 5,825,761 A | * 10/1998 | Tanaka et al. ............... | 370/333 |
| 5,828,672 A | * 10/1998 | Labonte et al. ............. | 714/708 |
| 5,839,077 A | * 11/1998 | Kowaguchi ................. | 455/517 |
| 5,864,589 A | * 1/1999 | Mourot et al. .............. | 375/341 |
| 5,867,531 A | * 2/1999 | Shiino et al. ............... | 375/262 |

FOREIGN PATENT DOCUMENTS

| | | | | |
|---|---|---|---|---|
| EP | 0715481 A | * 6/1996 | ............ | H04Q/7/38 |
| EP | 0 938 217 | 8/1999 | | |
| JP | 1-177232 (63-000477) | 7/1989 | | |
| JP | 8-181713 | 7/1996 | | |
| JP | 11-055317 | 2/1999 | | |
| JP | 11-088433 | 3/1999 | | |
| JP | 11-308273 | 11/1999 | | |

OTHER PUBLICATIONS

U.S. application No. 09/397,699, filed Sep. 16, 1999, pending.
U.S. application No. 09/408,507, filed Sep. 30, 1999, pending.

(List continued on next page.)

*Primary Examiner*—Vivian Chin
*Assistant Examiner*—Duc Nguyen
(74) *Attorney, Agent, or Firm*—Oblon, Spivak, McClelland, Maier & Neustadt, P.C.

(57) ABSTRACT

A mobile station of a two-frequency simplex radio communication system, in which communication between a base station and each mobile station is performed in such a manner that the base station continuously transmits packet data whereas each mobile station transmits burst data. The mobile station includes a radio wave propagation path condition detector for detecting the condition of a radio wave propagation path used for communication, and a communication control circuit which, when it is determined based on the condition of the radio wave propagation path detected by the radio wave propagation path condition detector, that transmission or reception timing cannot be obtained within a predetermined period of time, adaptively selects a transmission mode and notifies the base station of the selected transmission mode so as to receive data which is transmitted from the base station after the notification. This makes it possible to perform communication while maintaining a high transmission efficiency without having to perform a complicated process which needs a large amount of calculations.

21 Claims, 7 Drawing Sheets

OTHER PUBLICATIONS

U.S. application No. 09/429,897, filed Oct. 29, 1999, pending.
U.S. application No. 09/429,606, filed Oct. 29, 1999, pending.
U.S. application No. 09/429,898, filed Oct. 29, 1999, pending.
U.S. application No. 09/438,423, filed Nov. 12, 1999, pending.
U.S. application No. 09/458,100, filed Dec. 10, 1999, pending.
U.S. application No. 09/467,171, filed Dec. 20, 1999, pending.
U.S. application No. 09/479,621, filed Jan. 7, 2000, pending.
U.S. application No. 09/489,851, filed Jan. 24, 2000, pending.
U.S. application No. 09/439,097, filed Nov. 12, 1999, pending.
U.S. application No. 09/466,191, filed Dec. 17, 1999, pending.

* cited by examiner

MOVING SPEED (KM/H)
BER CHARACTERISTIC

RADIO COMMUNICATION SYSTEM AND COMPUTER PROGRAM PRODUCT FOR CONTROLLING AN OPERATION OF THE RADIO COMMUNICATION SYSTEM

CROSS REFERENCE TO RELATED APPLICATION

This application claims priority to Japanese Application No. Hei 10-321158, filed on Nov. 11, 1998, which is incorporated in its entirety.

BACKGROUND OF THE INVENTION

1. Field of the Invention

The present invention relates to a radio communication system for data communication and a computer program product stored on a storage medium for controlling an operation of the radio communication system.

2. Discussion of the Background

In a background communication technique in a radio communication system for transmitting mainly a voice signal, communication is performed only in accordance with the intention of calling, regardless of whether or not there is noise. This communication also does not consider the conditions or characteristics of a radio wave propagation path used for communication, because communication is required to be performed in real time. In many cases, data communication is also performed without considering whether or not there is noise, because the data communication is based on a voice communication technique.

Neglecting the conditions of the radio wave propagation path results in a large reduction in communication efficiency if there is large noise. In voice communication, an instantaneous error does not cause a serious problem (although it can cause noise during speech), because such a type of noise does not exert a great influence on the content of the speech.

On the contrary, data communication degradation in the signal can cause a serious problem. Unlike voice communication, an error is not allowed in data communication. Therefore, if an error occurs in a radio communication system, a receiving end sends an ARQ (automatic repeat request) signal to a sending end. In response, the sending end again transmits the data. The retransmission of data is performed until data is successfully transmitted without error. However, retransmission of data results in an increase in the amount of transmission required to transmit the same data. As a result, the throughput decreases.

In a two-frequency simplex radio communication system, there is a possibility that a collision with data transmitted from another mobile station occurs when an ARQ signal is sent from the receiving end (mobile station). This results in a further reduction in the throughput. Thus, it is important to reduce the number of times data is retransmitted in response to ARQ signals.

A waveform equalization technique for improving the digital error rate is disclosed in Japanese Patent Laid-Open No. 7-221804. In this technique, the transfer function of a transmission path is estimated and the inverse transfer function is calculated. The waveform of a signal containing distortion or noise is corrected into the original form using the inverse transfer function.

However, this technique needs an extremely large amount of calculations, and thus this technique does not meet the requirement that the radio communication device used in the radio communication system be small in size and consume small power.

Another problem of this technique is that when there is fast fading, linear demodulation is difficult and sufficient equalization cannot be obtained.

Another known technique of improving the digital error rate is to add a redundant code to data so that an error can be corrected by redundancy. In this technique, to obtain a high correction ability, it is required to use a large number of redundant codes. This results in a reduction in the transmission efficiency.

Japanese Patent Laid-Open No. 7-87011 discloses a radio communication system and a radio communication device in which communication between a mobile station and a base station is performed using a directional antenna. In this radio communication system, control of the base station needs a complicated process, and expensive facilities are required. Furthermore, because this technique employs a communication procedure including a step in which the base station analyzes the status of the mobile station, communication becomes impossible during a period in which analysis is performed.

Diversity transmission techniques such as space diversity, time diversity, and bus diversity are also known in the art to improve the digital error rate when communication is performed under a poor radio wave propagation path conditions. Among various diversity techniques, space diversity is most powerful. However, this technique has difficulties in achieving a small size, low cost, and low power consumption.

Japanese Patent Laid-Open No. 8-274781 discloses another technique of improving the digital error rate under a radio wave propagation path. In this technique, a service area in which an field strength high enough to receive information service is obtained is explicitly designated, for example, by coloring the floor in that area so that users can easily distinguish the service area. However, it is generally difficult to designate service areas in public locations in such a manner. In particular, this technique cannot be applied to a radio communication system having a wide service area such as several km. Besides, this technique needs an additional investment. Still another problem of this technique is that waveform distortion due to, for example, multipath delay cannot be detected from the field strength.

SUMMARY OF THE INVENTION

Accordingly, one object of the present invention is to solve the above-noted and other problems.

Another object of the present invention is to provide a radio communication device, a radio communication system, and a storage medium on which a program for implementing the functions of such a radio communication device or radio communication system is stored, whereby a high transmission efficiency can be maintained without having to perform a large amount of complicated calculations.

To solve these and other objects, the present invention provides on one example a mobile station of a two-frequency simplex radio communication system in which communication between a base station and each mobile station is performed in such a manner that the base station continuously transmits packet data and each mobile station transmits burst data. The mobile station includes a radio wave propagation path condition detecting mechanism for detecting a condition of a radio wave propagation path used for communication, and a communication control mechanism for adaptively controlling communication in accordance with the condition of the radio wave propagation path detected by the detecting mechanism.

The communication control mechanism adaptively selects a transmission mode when the condition detected by the detecting mechanism indicates that transmission or reception cannot be obtained in within a predetermined time period, and notifies the base station of the adaptively selected transmission mode. In addition, the mobile station receives data transmitted from the base station after the communication control mechanism notifies the base station about the adaptively selected transmission mode.

BRIEF DESCRIPTION OF THE DRAWINGS

A more complete appreciation of the invention and may of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
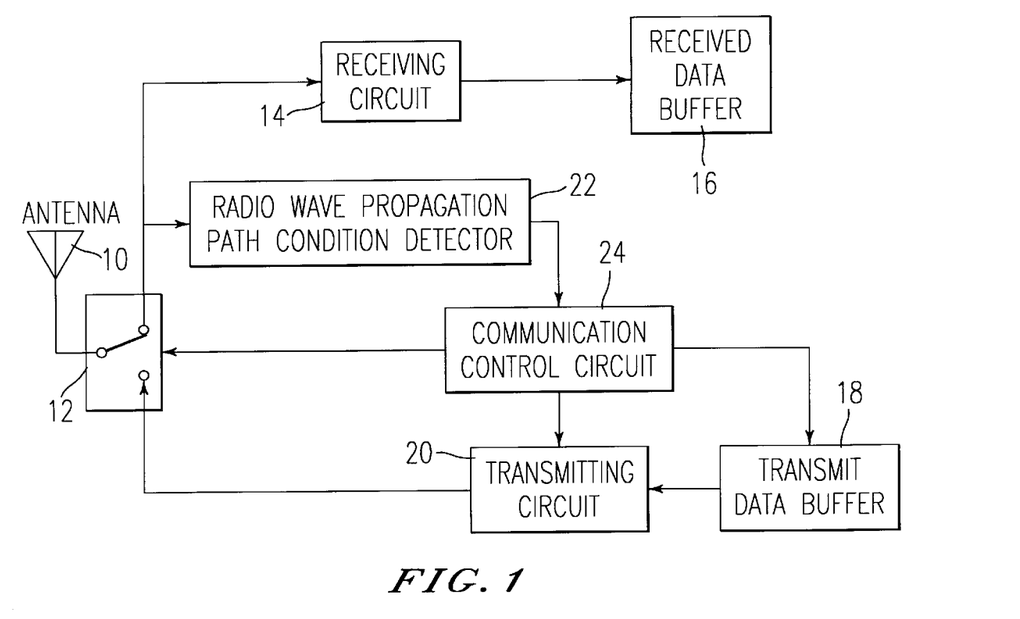
FIG. 1 is a block diagram illustrating the construction of a mobile station of a radio communication system according to an embodiment of the invention.

Referring now to the drawings, wherein like reference numerals designate identical or corresponding parts throughout the several views, FIG. 1 illustrates the construction of a mobile station of a radio communication system according to an embodiment of the present invention. As shown in FIG. 1, the mobile station of the radio communication system includes an antenna 10, a duplexer 12 for switching the connection between a transmitting part and a receiving part of the mobile station, a receiving circuit 14 for demodulating a signal received via the antenna 10 and for extracting received data, and a received data buffer 16 for storing the received data output from the receiving circuit 14.

The mobile station also includes a transmit data buffer 18 for storing transmit data, a transmitting circuit 20 for digitally modulating transmit data read from the transmit data buffer 18 in accordance with a predetermined modulation method and for outputting the resultant data, and a radio wave propagation path condition detector 22 for detecting, from the signal received via the antenna 10a, the condition of a radio propagation path used for communication. Also shown is a communication control circuit 24 for controlling the transmitting circuit 20 in accordance with a result given by the radio wave propagation path condition detector 22.

Figure 2:
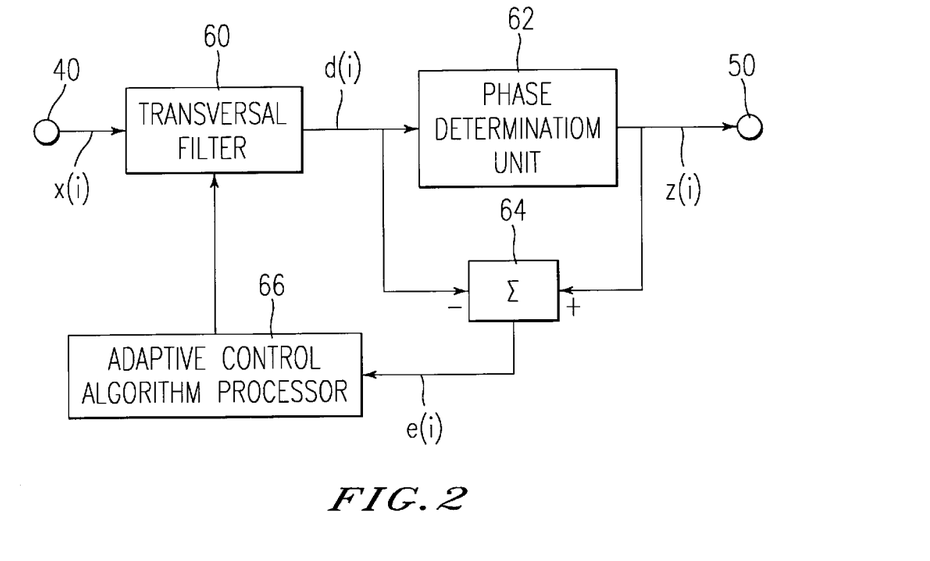
FIG. 2 is a block diagram illustrating the construction of an equalizer for performing phase compensation in frequency synchronization.

The operation of the mobile station of the radio communication system will now be described. First, the principles of detecting the condition of a radio wave propagation path using the radio transmission condition detector 22 are described with reference to FIGS. 2 to 6. FIG. 2 illustrates the construction of an equalizer for performing phase compensation for frequency synchronization control. In FIG. 2, the equalizer includes a transversal filter 60 serving as an adaptive phase control filter, a phase determination unit 62 for determining the phase space to which the demodulated symbol data belongs based on an output of the transversal filter 60 and a subtractor 64 for subtracting an output of the transversal filter 60 from the output of the phase determination unit 62. Also included is an adaptive control algorithm processor 66 for determining the tap coefficients of the transversal filter 60 so as to minimize the phase error data output from the subtractor 64.

In the present embodiment, the adaptive control algorithm processor 66 employs an LMS (least means square) algorithm. However, other adaptive control algorithms, such as an RLS (recursive least square) algorithm, may also be employed.

The adaptive phase control performed by the equalizer constructed in the above-described manner will now be described. In step 100 shown in FIG. 3, a demodulated signal x(i) output from a quadrature demodulator (not shown) is input to the transversal filter 60 of the equalizer. Phase compensation is performed on the demodulated signal x(i) in accordance with a filter characteristic determined by the tap coefficients set by the adaptive control algorithm processor 66 (step 102). When the filter characteristic of the transversal filter 60 is given by w(i), the output d(i) of the transversal filter 60 is given as $$d(i) = x(i) \cdot w(i) \qquad (1)$$

If the demodulated signal x(i) is given by x(i)=exp{j(ak+ 2πΔfT)}, the modulation phase component and the phase error of the demodulated signal are respectively given by exp(jak) and e(i)=exp(j2πΔfT), and if the filter characteristic of the transversal filter 60 is set as w(i)=exp(-j2πΔfT) by the adaptive control algorithm processor 66, the output d(i) of the transversal filter 60 is:

$$\begin{aligned} d(i) &= x(i) \cdot w(i) \qquad (2) \\ &= \exp\{j(ak + 2\pi\Delta fT)\} \cdot \exp(-j2\pi\Delta fT) \\ &= \exp(jak) \end{aligned}$$

Thus, the phase error e(i) is completely eliminated, and the original signal exp(jak) is extracted.

Figure 4:
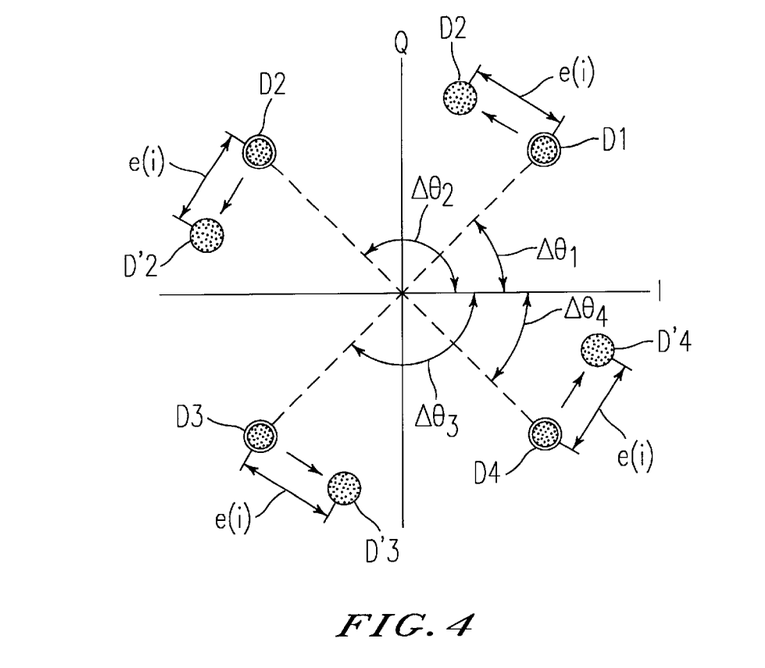
FIG. 4 is a schematic representation of the signal locations of symbol data output from the transversal filter of the equalizer shown in FIG. 2.

In a case where a 4-phase QPSK signal is demodulated, the phase difference data Δθk, (i.e., the difference in phase between adjacent elements of the phase series {θk} output from the transversal filter 60) falls into one of four quadrants of the I-Q coordinate system. That is, if the I axis is taken as the reference, Δθk (k=1, . . . , 4)=π/4 (first quadrant), 3π/4

(second quadrant), $-3\pi/4$ (third quadrant), or $-\pi/4$ (fourth quadrant), as shown in FIG. 4. Thus, the symbol data identified by the demodulated dibit is equal to one of the reference data D1, D2, D3, and D4 located in the respective quadrants of the I-Q coordinate system.

In practice, however, the transversal filter 60 cannot completely eliminate the phase error, and the output $d(i)$ of the transversal filter 60 includes a residual error $e(i)$. Thus, in step 104 of FIG. 3, the phase determination unit 62 determines in which quadrant of the orthogonal I-Q coordinate system the phase difference obtained from the output $d(i)$ of the transversal filter 60 lies. The phase determination unit 62 then determines that the input symbol data corresponds to the reference data assigned to the quadrant in which the input phase difference data $\Delta\theta k$ has been found to lie, and outputs the determined data (step 106). Here, the output of the phase determination unit 62 is represented by $z(i)$.

Figure 3:
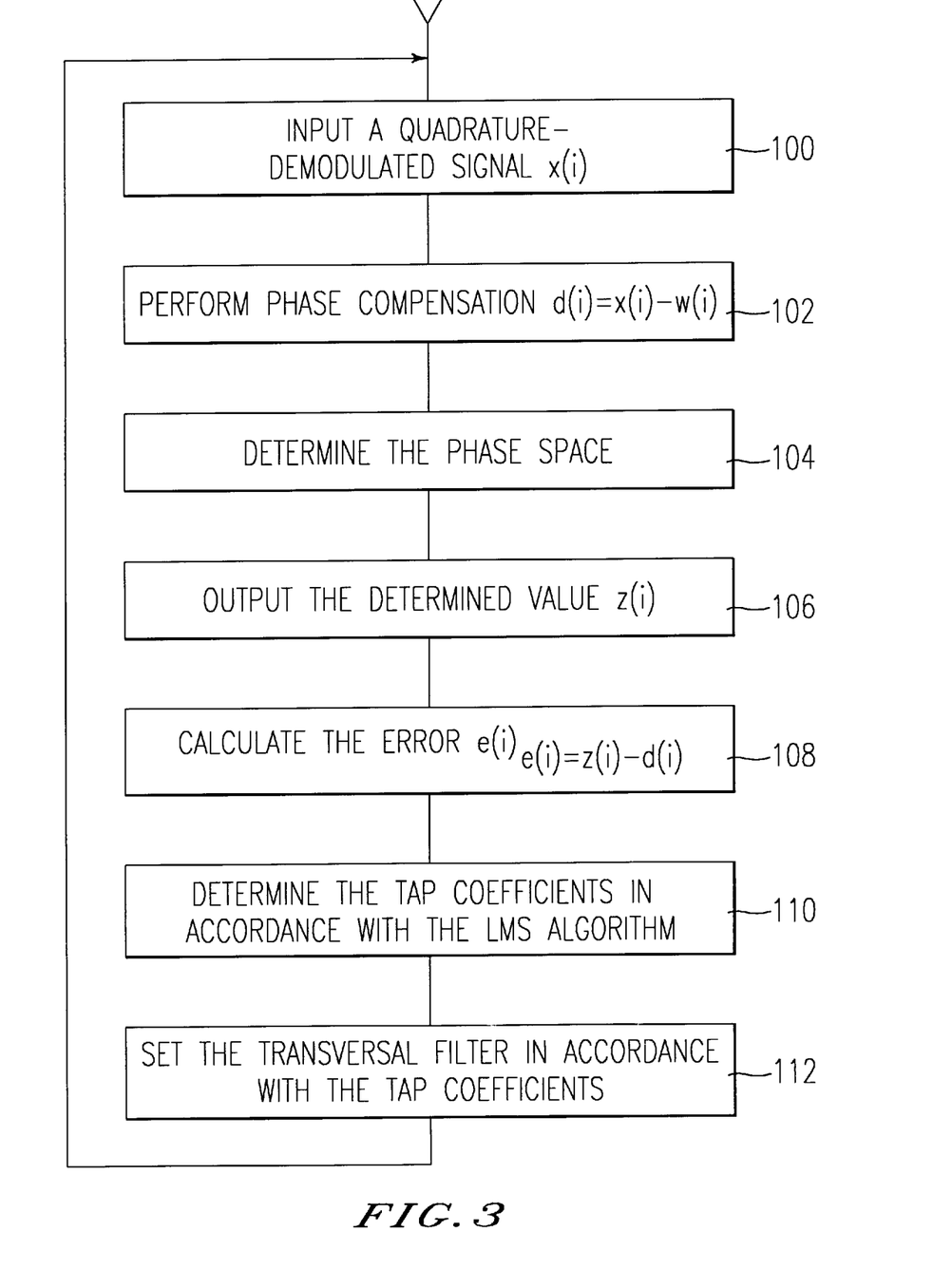
FIG. 3 is a flow chart illustrating the operation of adaptively controlling the phase of the equalizer shown in FIG. 2.

In the next step 108, the subtractor calculates the phase error $e(i)$ in accordance with equation (3) shown below.

$$e(i)=z(i)-d(i) \quad (3)$$

The calculated phase error $e(i)$ is input to the adaptive control algorithm processor 66. The adaptive control algorithm processor 66 performs a calculation in accordance with the LMS algorithm so as to determine the tap coefficients of the transversal filter 60 such that the phase error $e(i)$ is minimized. The transversal filter 60 is then set in accordance with the resultant tap coefficients (steps 110 and 112). Thus, the phase error $e(i)$ is compensated.

Figure 5:
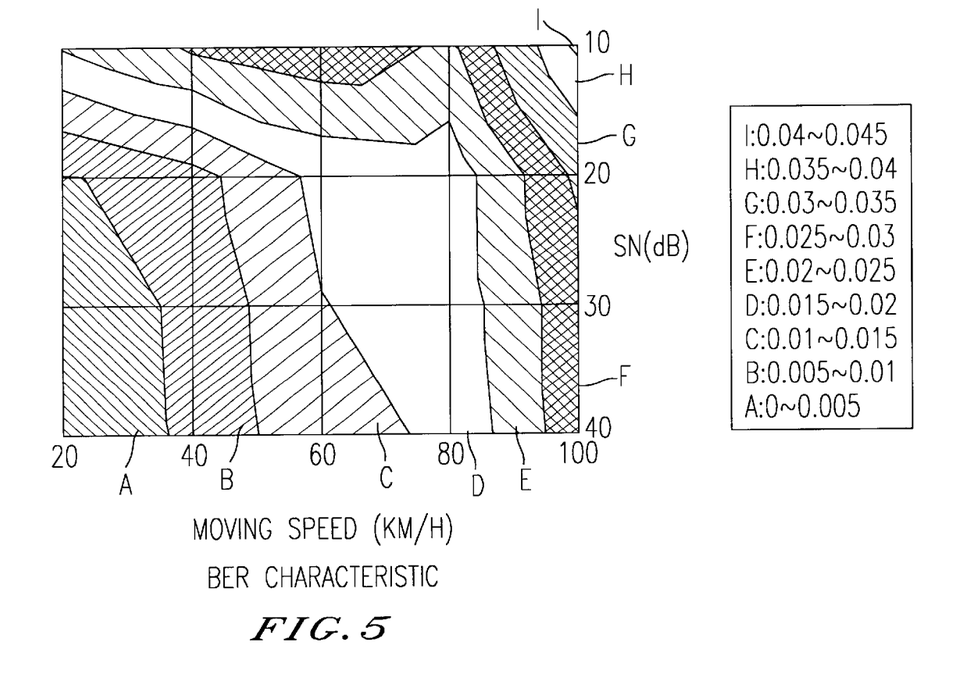
FIG. 5 is a graph illustrating the bit error rate characteristic of the demodulated output in the mobile station of the radio communication system.
Figure 6:
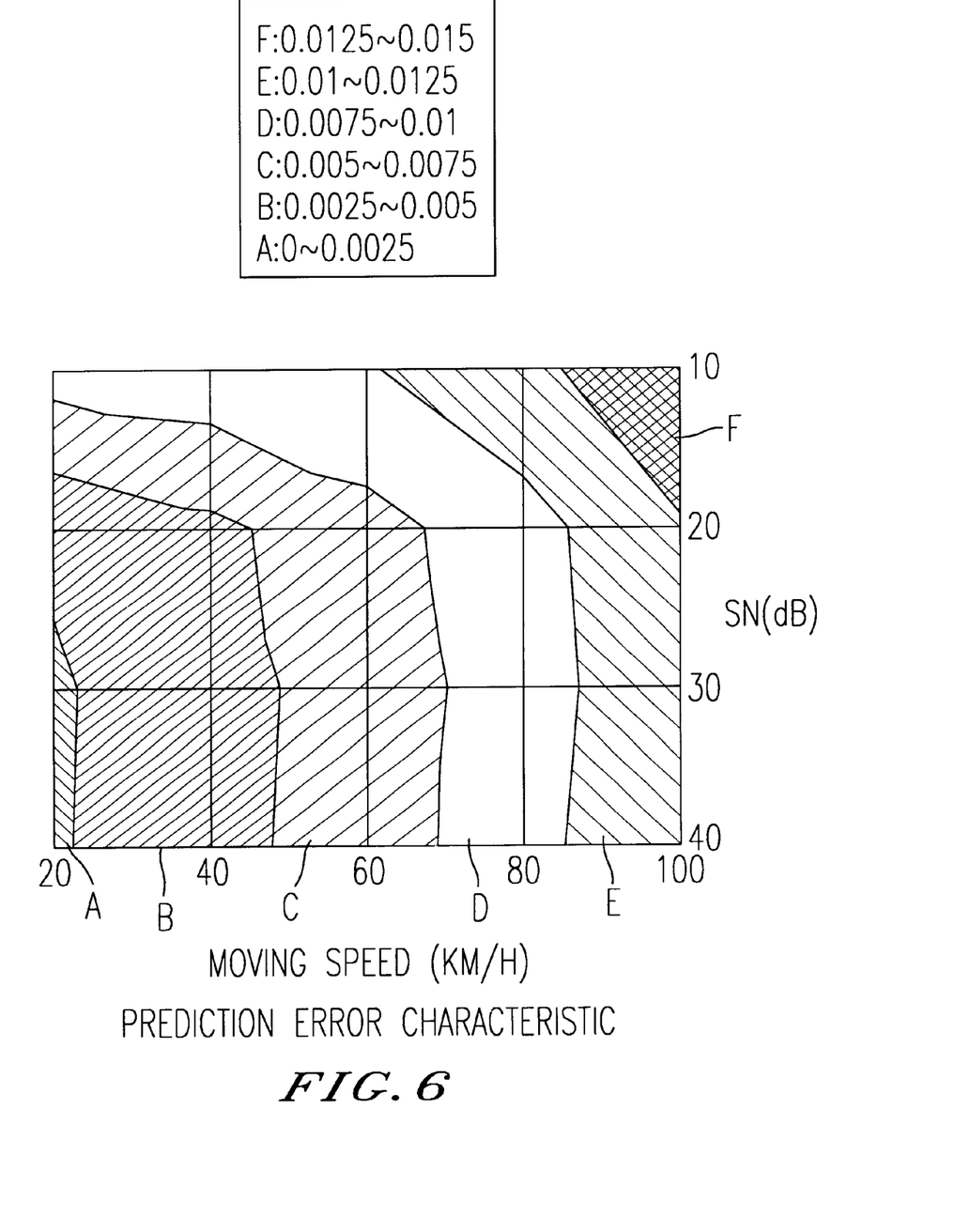
FIG. 6 is a graph illustrating the variance of the estimation error of the phase compensation in the mobile station of the radio communication system.

The inventors of the present invention have found that, in the above-described phase compensation using the equalizer, the difference between the output of the phase determination unit 62 and the output of the transversal filter 60 having the filter characteristics set by the adaptive control algorithm processor 66 in accordance with the LMS algorithm (i.e., the variance of the estimation error $e(i)$ in the phase compensation) has a high correlation with the bit error rate (BER) of the demodulated output as described below with reference to FIGS. 5 and 6. FIG. 5 shows the simulated characteristic in terms of the bit error rate (BER) of the demodulated output, and FIG. 6 shows the simulated characteristic in terms of the estimation error in the phase compensation. In each of the FIGS. 5 and 6, the horizontal axis represents a moving speed of a mobile station, and the vertical axis represents a signal-to-noise ratio of a received signal from a base station. That is, areas A–I denote a distribution of the bit error rate of the demodulated output. In FIG. 5, area A denotes a bit error rate of 0 to 0.005, area B denotes a bit error rate of 0.005 to 0.01, area C denotes a bit error rate of 0.01 to 0.015, area D denotes a bit error rate of 0.015 to 0.02, area E denotes a bit error rate of 0.02 to 0.025, area F denotes a bit error rate of 0.025 to 0.03, area G denotes a bit error rate of 0.03 to 0.035, area H denotes a bit error rate of 0.035 to 0.04, and area I denotes a bit error rate of 0.04 to 0.045. In FIG. 6, areas A–F denote a distribution of the estimation error $e(i)$. That is, area A denotes an estimation error $e(i)$ of 0 to 0.0025, area B denotes an estimation error of 0.0025 to 0.005, area C denotes an estimation error of 0.005 to 0.0075, area D denotes an estimation error of 0.0075 to 0.001, area E denotes an estimation error of 0.001 to 0.0125, and area F denotes an estimation error of 0.0125 to 0.015.

As can be seen from FIGS. 5 and 6, under a condition of Rayleigh flat fading, the bit error rate (BER) of the demodulated output and the variance of the estimation errors $e(i)$ increase in proportion to a ratio of the Doppler frequency (the moving speed of the mobile station) to the signal-to-noise ratio of the received signal from the base station. This means that the employment of the variance of the estimation errors $e(i)$ in phase compensation makes it possible to detect the characteristics of the radio wave propagation path, such as the moving speed, multipath fading, and the signal-to-noise ratio, which cannot be detected from the field strength.

In the present invention, in view of the above, a condition of the radio wave propagation path used in communication (i.e., a condition of the radio wave) is detected based on the correlation between the variance of the estimation errors $e(i)$ and the bit error rate (BER) of the demodulated output. In addition, communication is adaptively controlled depending on the detected condition.

Figure 7:
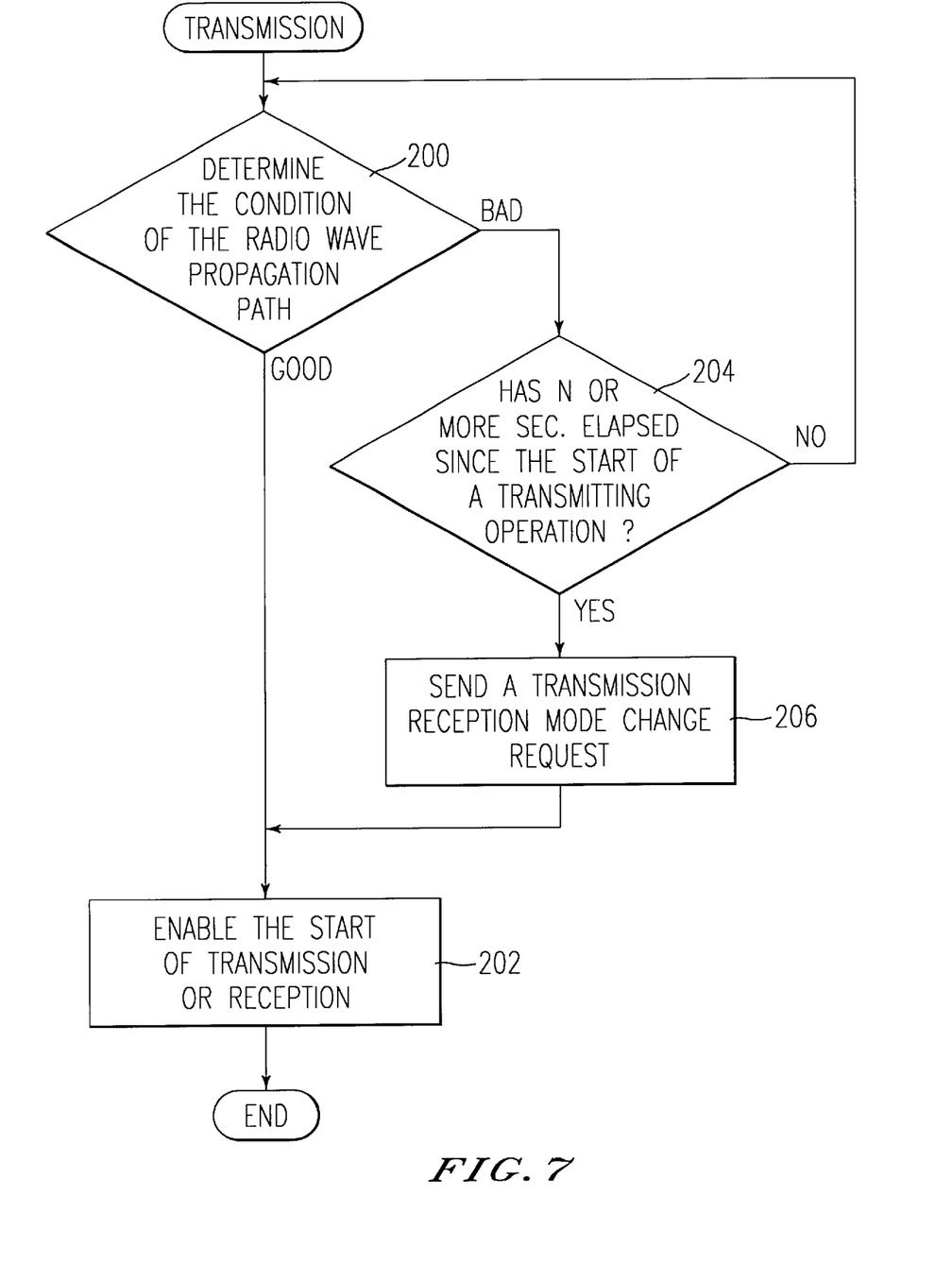
FIG. 7 is a flow chart illustrating the transmission controlling operation performed by the communication control circuit in the mobile station of the radio communication system shown in FIG. 1.
Figure 8:
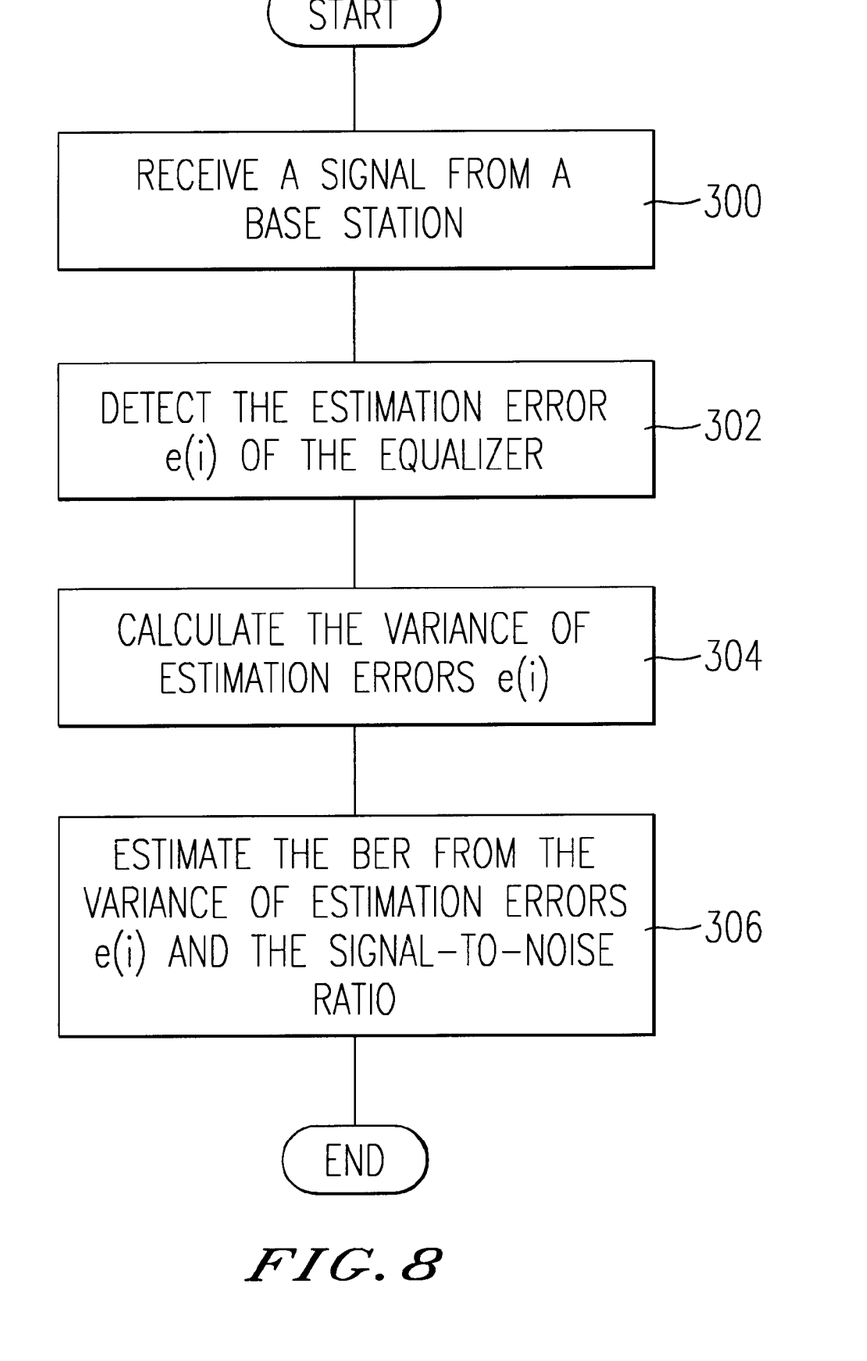
FIG. 8 is a flow chart illustrating the detecting operation performed by the radio wave propagation path condition detector in the mobile station of the radio communication system shown in FIG. 1.
Figure 9:
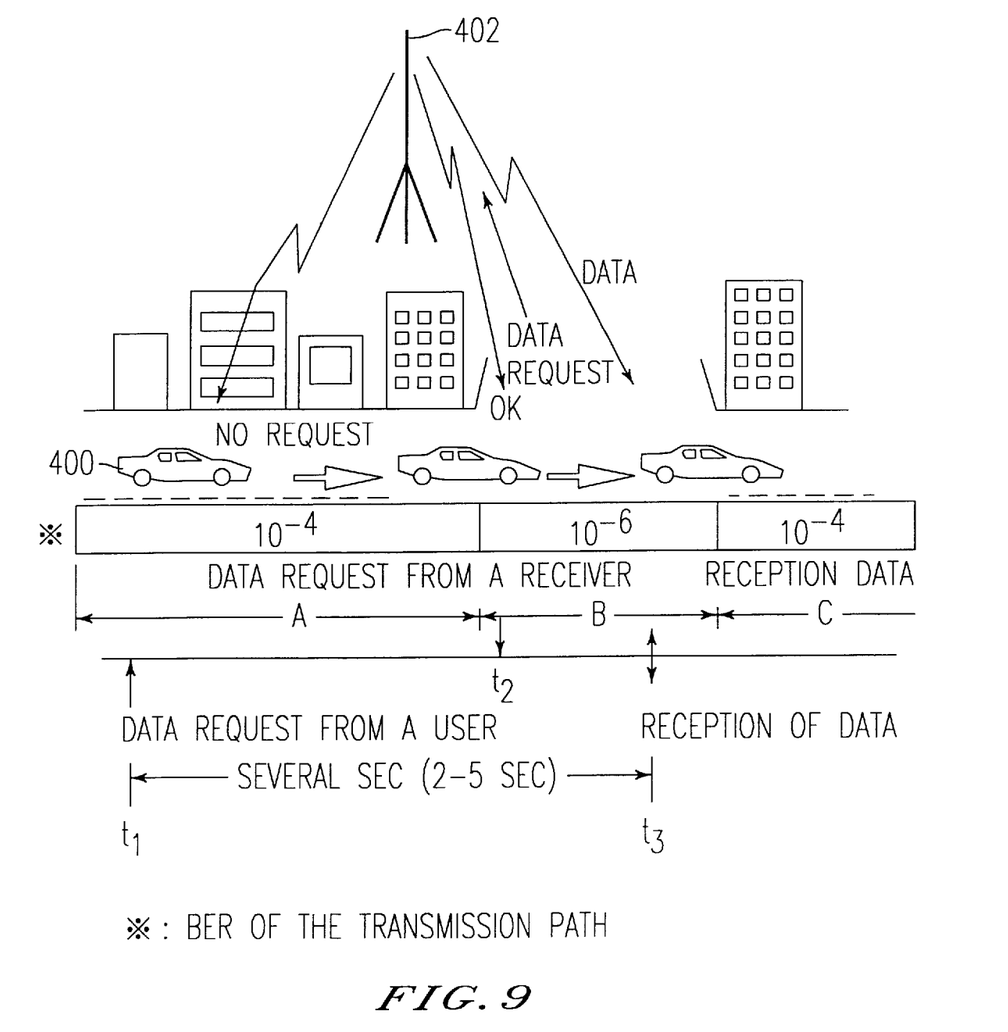
FIG. 9 is a schematic diagram illustrating a specific example of the communication condition under which the mobile station of the radio communication system shown in FIG. 1 performs communication.

Referring to FIGS. 7 to 9, a control of the transmission operation of the mobile station in the radio communication system according to an embodiment of the present invention is described. FIG. 7 illustrates the manner in which the transmission operation is controlled by the communication control circuit 24 shown in FIG. 1, and FIG. 8 illustrates the detecting operation of the radio wave propagation path condition detector 22. In FIG. 7, when the communication control circuit 24 starts to control the transmission operation, it is determined whether or not the condition of the radio wave propagation path is good based on the output of the radio wave propagation path condition detector 22 (step 200). If it determined in step 200 that the radio wave propagation path is in good condition, the start of a transmission or reception operation is allowed in step 202.

On the other hand, if it is determined in step 200 that the radio wave propagation path is not in good condition, the process waits until a predetermined period of time has elapsed since the start of the control of the transmission operation (steps 204 and 200). If the predetermined period time has elapsed, a transmission mode change request corresponding to reception data is issued (step 206), and the process goes to step 202. Here, the transmission mode change request corresponding to reception data made in step 206 refers to requesting the base station to change the transmission mode into a mode in which the same data is transmitted two or more times, or data is transmitted with a greater degree of redundancy so that a high error correction ability is obtained. When the transmission or reception timing is not obtained within the predetermined period of time, the transmission mode is not fixed to a particular mode. That is, in this system, an error correction method, a degree of redundancy, a correction number, a degree of data multiplexing, and a control of time diversity are not fixed.

In the mobile station as described above, communication is performed without using a waveform equalization technique. Furthermore, an occurrence of automatic repeat request (ARQ) is minimized and the transmission is performed in a highly efficient manner. In addition, in control of the communication operation, the degree of redundancy of data transmitted from the base station is adaptively changed.

Also, in the present embodiment of the invention, the mobile station does not use spatial characteristics (such as space diversity or a directional antenna) and does not need external information (such as the moving speed of the mobile station detected by an external sensor). This allows reductions in size, cost, and power consumption of the mobile station.

An operation of the radio wave propagation path condition detector 22 to detect the condition of the radio wave propagation path is described below. In FIG. 8, a signal from a base station is received (step 300).

In the next step 302, the estimation error e(i) of the phase compensation of the equalizer (not shown) is calculated from the received signal. In step 304, the variance V of the estimation errors e(i) of the phase compensation is calculated. Subsequently, a table representing a correlation between the variance of the estimation errors e(i) and the bit error rate (BER) is referred to, and the bit error rate (BER) of the radio wave propagation path used for communication with the base station is estimated from the signal-to-noise ratio of the received signal and the variance of the estimation errors e(i) of the phase compensation obtained in steps 300, 302, and 306. This makes it possible to detect an increase in the bit error rate, which can occur even when the field strength is large enough, owing to for example waveform distortion, such as a delayed wave caused by frequency selective fading. It is also possible to detect a noise component such as adjacent channel interference, which cannot be detected from the field strength.

A specific example of the operation of controlling communication with the mobile station of the radio communication system described above with reference to FIG. 7 is described in further detail below with reference to FIG. 9. In FIG. 9, a car 400 on which a mobile station is installed is moving along a city street while performing data communication with a base station 402 across the street. In zone A, the radio wave propagation path is influenced by obstructions, such as buildings, and thus the transmission condition is poor. In zone B, there is no obstruction and a good transmission condition is obtained. Also, Zone C includes obstructions as in zone A, and the condition of the radio wave propagation path is not good. The bit error rates in the respective zones are shown in FIG. 9. Data transmission between the mobile station and the base station 402 requires about 200 msec.

Assume that the user of the mobile station in the car 400 issues a data transmission request to the base station at time t1 when the car enters the zone A under the above-described conditions. Although the mobile station accepts this request from the user, the mobile station does not immediately respond to the transmission request, because the radio wave propagation path condition detector 22 determines that the condition of the radio wave propagation path is poor when the mobile station is in zone A. If the poor condition of the radio wave propagation path has continued for a predetermined time period after the start of the transmission control operation, the mobile station requests the base station 402 to transmit data in a mode in which data is transmitted a plurality of times or a mode in which data is transmitted after converting it into the form with a high error correction capability by increasing a degree of redundancy.

In the case where the car 400 with the installed mobile station enters the good-condition zone B at time t2 before the bad condition of the radio wave propagation path continues for the predetermined period of time after the start of the transmission control operation, the mobile station is enabled to start transmission or reception of data and requests the base station to transmit data. Thus, at time t3, the mobile station receives data from the base station.

Table 1 shows the bit error rate for the case where communication is adaptively performed such that the moving speed of the mobile station is varied and communication is started when the estimation error becomes lower than a threshold value and also for the case where communication is randomly started when the mobile station is moving, without performing adaptive control.

TABLE I

| COMMUNICATION MODE | RANDOM | ADAPTIVE |
| --- | --- | --- |
| BER | 0.00324 | 0.0000162 |

As can be seen from Table 1, the adaptive control of communication according to the present invention allows the mobile station of the radio communication system to have an extremely low bit error rate.

As described above, in the mobile station of the radio communication system for data transmission according to the present embodiment of the invention, the condition of the radio wave propagation path used for communication is detected by the radio wave propagation path condition detecting unit, and communication is adaptively controlled by a communication control means depending on the condition of the radio wave propagation path detected by the radio wave propagation path condition detecting unit. Thereby, it is assured that a high transmission rate can be maintained in the mobile station of the radio communication system without having to perform a complicated process which needs a large amount of calculations. That is, the present embodiment of the invention does not have to perform a complicated process, such as the determination of the inverse transfer function of the radio wave propagation path, which will need a large amount of calculations. Furthermore, it is possible to reduce the number of occurrences of ARQ signals, and transmission collisions among mobile stations can be avoided. As a result, the radio communication system can operate in a highly stable and reliable fashion.

In addition, in the present embodiment of the invention, changes in characteristics such as the moving speed and the signal-to-noise ratio which vary with the changes in the environmental conditions are detected from the received signal, and thus communication can be controlled in a simple fashion without needing an additional sensor such as a speed sensor. That is, it is possible to realize a low power consumption mobile station without using an external sensor into a small form at low cost.

Also, in the present embodiment of the invention, a low bit error rate can be obtained, and thus it is allowed to employ a low degree of redundancy for error correction. This results in an increase in the transmission efficiency. In addition, the low bit error rate results in a reduction in the occurrences of retransmission due to ARQ (automatic repeat request). As a result, a high throughput can be obtained.

Furthermore, in the present embodiment of the invention, because the characteristics of the radio wave propagation path can be predicted in advance, it becomes possible to transmit data in a duplicated fashion. That is, as opposed to the background techniques in which ARQ (automatic repeat request) is generated depending on the result of each transmission operation, communication can be performed in a short period of time.

Still furthermore, in the present embodiment of the invention, it is possible to detect an increase in the bit error rate which can occur, even when the field strength is large enough, owing to for example waveform distortion caused by frequency selective fading, and it is also possible to detect a noise component such as adjacent channel interference which cannot be detected from the field strength.

The present invention also includes a program on a computer readable storage medium for implementing the functions of controlling the mobile station. The program includes a radio wave propagation path condition detecting mechanism for detecting the condition of a radio wave propagation path used for communication and communication control mechanism for adaptively controlling communication in accordance with the condition of the radio wave propagation path detected by the radio wave propagation path condition detecting mechanism. The program may be loaded into a computer system and may be executed thereby controlling communication.

Furthermore, in the mobile station of the two-frequency simplex radio communication system in which communication between a base station and each mobile station is performed in such a manner that the base station continuously transmits packet data whereas each mobile station transmits burst data, a program for implementing the functions of controlling the mobile station may be stored on a computer-readable storage medium. The program includes radio wave propagation path condition detecting mechanism for detecting the condition of a radio wave propagation path used for communication and communication control mechanism for adaptively controlling communication in accordance with the condition of the radio wave propagation path detected by the radio wave propagation path condition detecting mechanism. The program may be loaded into a computer system and may be executed thereby controlling communication.

Still furthermore, in the mobile station of the two-frequency simplex radio communication system in which communication between a base station and each mobile station is performed in such a manner that the base station continuously transmits packet data whereas each mobile station transmits burst data, a program for implementing the functions of controlling the mobile station may be stored on a computer readable storage medium. The program includes a radio wave propagation path condition detecting mechanism for detecting the condition of a radio wave propagation path used for communication, and communication control mechanism which, when it is determined, based on the condition of the radio wave propagation path detected by the radio wave propagation path condition detecting mechanism, that transmission or reception timing cannot be obtained within a predetermined period of time, adaptively selects a transmission mode, notifies the base station of the selected transmission mode, and receives data which is transmitted from the base station after said notification. The program may be loaded into a computer system and may be executed thereby controlling communication.

In addition, a program for implementing the functions of controlling the mobile station may be stored on a computer readable storage medium and in which the radio wave propagation path condition detecting means employs, as the signal indicating the condition of the radio wave propagation path, the variance of estimation error signals of an equalizer for compensating for a frequency error in frequency synchronization. The program may be loaded into a computer system and may be executed thereby controlling communication.

Still furthermore, a program for implementing the functions of controlling the mobile station may be stored on a computer readable storage medium and in which the radio wave propagation path condition detecting mechanism detects whether or not there is a delay error on the basis of the tap coefficient of an equalizer used for waveform equalization of a delayed wave of an incoming signal and also on the basis of an estimation error signal and employs the detected signal as the signal indicating the condition of the radio wave propagation path. The program may be loaded into a computer system and may be executed thereby controlling communication.

Also, a program for implementing the functions of controlling the mobile station may be stored on a computer readable storage medium and in which the communication control mechanism performs control such that the timing of communication is selected in accordance with the selection output of the radio wave propagation path condition detecting mechanism. The program may be loaded into a computer system and may be executed thereby controlling communication.

The "computer system" may include an OS and hardware such as a peripheral device. The "computer readable storage medium" is used to refer to a wide variety of storage media. They include a removable/portable medium such as a floppy disk, a magneto-optical disk, a ROM, a CD-ROM, etc., and a storage device such as a hard disk installed in a computer system. Furthermore, the "computer readable storage medium" also includes a medium which dynamically stores a program for a short time, such as an Internet network, a telephone line, and other communication lines, via which a program is transmitted. In this case, a storage medium such as a volatile memory which is installed in a computer system serving as a server or a client and which stores a program for a certain period of time is also a "computer readable storage medium." The "program" may be a program which implements some part of the functions described above. Furthermore, the "program" may be such a program which is combined with a program which has been already installed on a computer system to implement the functions described above.

As described above, the present invention provides great advantages. That is, in the radio communication system for data communication, the condition of a radio wave propagation path used for communication is detected on the basis of a received signal, and communication is adaptively controlled in accordance with the condition of the radio wave propagation path, thereby ensuring that a high transmission rate can be maintained in the radio communication system for data communication without having to perform a complicated process which needs a large amount of calculations. Furthermore, in this radio communication system for data communication, changes in characteristics such as the moving speed and the signal-to-noise ratio which vary with the changes in the environmental conditions are detected from the received signal, and thus the system may be constructed in a simple fashion without needing additional sensors such as a speed sensor. That is, it is possible to realize a low power consumption system without using an external sensor into a small form at low cost.

In addition, in the mobile station of the radio communication system for data communication, the condition of the radio wave propagation path used for communication is detected by the radio wave propagation path condition detecting mechanism, and communication is adaptively controlled by communication control mechanism depending on the condition of the radio wave propagation path detected by the radio wave propagation path condition detecting mechanism, thereby ensuring that a high transmission rate can be maintained in the mobile station of the radio communication system for radio communication without having to perform a complicated process which needs a large amount of calculations. Furthermore, in this mobile station for use in the radio communication system for data communication, changes in characteristics such as the moving speed and the signal-to-noise ratio which vary with the changes in the environmental conditions are detected from the received signal, and thus the mobile station may be constructed in a simple fashion without needing additional sensors such as a speed sensor. That is, it is possible to realize a low power consumption mobile station without using an external sensor into a small form at low cost.

In the mobile station of the two-frequency simplex radio communication system in which communication between a base station and each mobile station is performed in such a manner that the base station continuously transmits packet data whereas each mobile station transmits burst data, the condition of the radio wave propagation path used for communication is detected by the radio wave propagation path condition detecting mechanism, and communication is adaptively controlled by communication control mechanism depending on the condition of the radio wave propagation path detected by the radio wave propagation path condition detecting mechanism, thereby ensuring that a high transmission rate can be maintained in the mobile station of the two-frequency simplex radio communication system without having to perform a complicated process which needs a large amount of calculations. Furthermore, the number of occurrences of ARQ signals decreases, and transmission collisions among mobile stations can be avoided. As a result, the radio communication system can operate in a highly reliable fashion.

In the mobile station of the two-frequency simplex radio communication system in which communication between a base station and each mobile station is performed in such a manner that the base station continuously transmits packet data whereas each mobile station transmits burst data, the condition of the radio wave propagation path used for communication is detected by the radio wave propagation path condition detecting mechanism, and when it is determined, on the basis of the condition of the radio wave propagation path detected by the radio wave propagation path condition detecting mechanism, that transmission timing cannot be obtained within a predetermined period of time, a transmission mode is adaptively selected, and the base station is notified of the selected transmission mode. Data transmitted from the base station after the notification is received. Thus, a high transmission rate can be maintained in the mobile station of the two-frequency simplex radio communication system without having to perform a complicated process which needs a large amount of calculations. Furthermore, the number of occurrences of ARQ signals decreases, and transmission collisions among mobile stations can be avoided. As a result, the radio communication system can operate in a highly reliable fashion.

In the mobile station of the radio communication system, the radio wave propagation path condition detecting mechanism may employ, as the signal indicating the condition of the radio wave propagation path, a variance of estimation error signals of an equalizer for compensating for a frequency error in frequency synchronization, thereby ensuring that a high transmission rate can be maintained in the mobile station of the radio communication system without having to perform a complicated process which needs a large amount of calculations.

In this mobile station of the radio communication system, the radio wave propagation path condition detecting mechanism may detect whether or not there is a delay error on the basis of the tap coefficient of an equalizer used for waveform equalization of a delayed wave of an incoming signal and also on the basis of an estimation error signal and may employ the detected signal as the signal indicating the condition of the radio wave propagation path, thereby ensuring that a high transmission rate can be maintained without having to perform a complicated process which needs a large amount of calculations.

In this mobile station of the radio communication system, the communication control mechanism may perform control such that the timing of communication is selected in accordance with the selection output of the radio wave propagation path condition detecting mechanism, and thus a high transmission rate can be maintained without having to perform a complicated process which needs a large amount of calculations.

Furthermore, the program according to the present invention executes the steps of detecting the condition of a radio wave propagation path used for communication on the basis of a received signal and adaptively controlling communication depending on the condition of the radio wave propagation path. The program may be loaded on a computer system and executed to control communication thereby ensuring that a high transmission rate can be maintained in the mobile station of the radio communication system without having to perform a complicated process which needs a large amount of calculations.

Obviously, numerous modifications and variations of the present invention are possible in light of the above teachings. It is therefore to be understood that within the scope of the appended claims, the invention may be practiced otherwise than as specifically described herein.

What is claimed is:

1. A radio communication system, comprising:
  a detector configured to detect a condition of a radio transmission path between a mobile station and a base station; and
  a communication control circuit configured to adaptively control communication between the mobile station and base station in accordance with the condition of the radio transmission path detected by the detector,
    wherein the detector receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

2. A mobile station of a radio communication system, comprising:
  radio transmission path condition detecting means for detecting a condition of a radio transmission path used for communication; and
  communication control means for adaptively controlling communication in accordance with the condition of the radio transmission path detected by the detecting means,
    wherein the detecting means receives a signal from a base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

3. The mobile station according to claim 2, wherein the detecting means detects whether or not there is a delay error based on 1) a tap coefficient of an equalizer used for waveform equalization of a delayed wave of an incoming signal and 2) an estimation error signal, and
  wherein the detecting means uses the detected signal as a signal indicating the condition of the radio wave propagation path.

4. The mobile station according to claim 2, wherein the communication control means performs control such that a timing of communication is selected in accordance with a selection output of the detecting means.

5. A mobile station of a two-frequency simplex radio communication system in which communication between a base station and each mobile station is performed in such a manner that the base station continuously transmits packet data and each mobile station transmits burst data, the mobile station comprising:

radio transmission path condition detecting means for detecting a condition of a radio transmission path used for communication; and communication control means for adaptively controlling communication in accordance with the condition of the radio transmission path detected by the detecting means, wherein the detecting means receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

6. The mobile station according to claim 5, wherein the communication control means adaptively selects a transmission mode when the condition detected by the detecting means indicates that transmission could not be obtained within a predetermined time period, and notifies the base station of the adaptively selected transmission mode, and wherein the mobile station receives data transmitted from the base station after the communication control means notifies the base station about the adaptively selected transmission mode.

7. A mobile station of a radio communication system, comprising:

a radio transmission path condition detector configured to detect a condition of a radio transmission path used for communication; and a communication control circuit configured to adaptively control communication in accordance with the condition of the radio transmission path detected by the detector, wherein the detector receives a signal from a base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

8. The mobile station according to claim 7, wherein the detector detects whether or not there is a delay error based on 1) a tap coefficient of an equalizer used for waveform equalization of a delayed wave of an incoming signal and 2) an estimation error signal, and wherein the detector uses the detected signal as a signal indicating the condition of the radio wave propagation path.

9. The mobile station according to claim 7, wherein the communication control circuit performs control such that a timing of communication is selected in accordance with a selection output of the detector.

10. A mobile station of a two-frequency simplex radio communication system in which communication between a base station and each mobile station is performed in such a manner that the base station continuously transmits packet data and each mobile station transmits burst data, the mobile station comprising:

a radio transmission path condition detector configured to detect a condition of a radio transmission path used for communication; and a communication control circuit configured to adaptively control communication in accordance with the condition of the radio transmission path detected by the detector, wherein the detector receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

11. The mobile station according to claim 10, wherein the communication control circuit adaptively selects a transmission mode when the condition detected by the detector indicates that transmission could not be obtained within a predetermined time period, and notifies the base station of the adaptively selected transmission mode, and wherein the mobile station receives data transmitted from the base station after the communication control circuit notifies the base station about the adaptively selected transmission mode.

12. A radio communication method including a mobile station, comprising:

detecting a condition of a radio transmission path used for communication; and adaptively controlling communication in accordance with the condition of the radio transmission path detected by the detecting step, wherein the detecting step receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

13. The method according to claim 12, wherein the detecting step detects whether or not there is a delay error based on 1) a tap coefficient of an equalizer used for waveform equalization of a delayed wave of an incoming signal and 2) an estimation error signal, and wherein the detecting step uses the detected signal as a signal indicating the condition of the radio wave propagation path.

14. The method according to claim 12, wherein the controlling step performs control such that a timing of communication is selected in accordance with a selection output of the detecting step.

15. A method of a two-frequency simplex radio communication system in which communication between a base station and each mobile station is performed in such a manner that the base station continuously transmits packet data and each mobile station transmits burst data, the mobile station comprising:

detecting a condition of a radio transmission path used for communication; and adaptively controlling communication in accordance with the condition of the radio transmission path detected by the detecting step, wherein the detecting step receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

16. The method to claim 15, wherein the controlling step adaptively selects a transmission mode when the condition detected by the detecting step indicates that transmission or reception cannot be obtained within a predetermined time period, and notifies the base station of the adaptively selected transmission mode, and wherein the mobile station receives data transmitted from the base station after the controlling step notifies the base station about the adaptively selected transmission mode.

17. A mobile station of a radio communication system, comprising:

an antenna configured to receive and transmit signals to a base station;

a transmitting circuit configured to digitally modulate transmit data in accordance with a predetermined modulation method;

a detector configured to detect a condition of a radio propagation path used for communication between the mobile station and the base station; and a communication control circuit configured to control the transmitting circuit in accordance with the condition of the radio propagation path detected by the detector, wherein the detector receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

18. The mobile station according to claim 17, wherein the control circuit adaptively selects a transmission mode, different from a previous transmission mode, when the condition of the radio propagation path detected by the detector indicates transmission could not be obtained within a predetermined time, wherein the control circuit controls the controls the transmitting circuit to notify the base station of the adaptively selected transmission mode, and wherein the mobile station receives data transmitted from the base station with the adaptively selected transmission mode after the control circuit notifies the base station.

19. A computer program product of a radio communication system, comprising:

a first computer code configured to detect a condition of a radio transmission path used for communication; and a second computer code configured to adaptively control communication in accordance with the condition of the radio transmission path detected by the first computer code, wherein the first computer code receives a signal from the base station, calculates an estimation error of a phase compensation of an equalizer from the received signal, calculates a variance of the estimation errors of the phase compensation, and estimates a Bit Error Rate (BER) of the radio transmission path by referring to a table representing a correlation between the variance of the estimated errors and the BER.

20. The computer program product according to claim 19, wherein the first computer code detects whether or not there is a delay error based on 1) a tap coefficient of an equalizer used for waveform equalization of a delayed wave of an incoming signal and 2) an estimation error signal, and wherein the first computer code uses the detected signal as a signal indicating the condition of the radio wave propagation path.

21. The computer program product according to claim 19, wherein the second computer code performs control such that a timing of communication is selected in accordance with a selection output of the first computer code.

* * * * *